United States Patent
Shigezumi et al.

(10) Patent No.: US 8,501,358 B2
(45) Date of Patent: Aug. 6, 2013

(54) SOLID OXIDE FUEL CELL DEVICE

(75) Inventors: Tsukasa Shigezumi, Kitakyushu (JP);
Toshiharu Otsuka, Kitakyushu (JP);
Katsuhisa Tsuchiya, Kitakyushu (JP);
Kiyotaka Nakano, Kitakyushu (JP);
Toshiharu Ooe, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 253 days.

(21) Appl. No.: 12/893,478

(22) Filed: Sep. 29, 2010

(65) Prior Publication Data

US 2011/0076578 A1    Mar. 31, 2011

(30) Foreign Application Priority Data

Sep. 30, 2009   (JP) ................................. 2009-227347
Aug. 10, 2010   (JP) ................................. 2010-179313

(51) Int. Cl.
*H01M 8/06*       (2006.01)
(52) U.S. Cl.
USPC ............................. 429/423; 429/479; 429/428
(58) Field of Classification Search
USPC .......................................... 429/423, 479, 428
See application file for complete search history.

(56) References Cited

U.S. PATENT DOCUMENTS

| | | | |
|---|---|---|---|
| 6,329,089 B1 | 12/2001 | Roberts et al. | |
| 7,838,161 B2 * | 11/2010 | Lee et al. | 429/429 |
| 2009/0291335 A1 | 11/2009 | Anzai | |
| 2010/0310951 A1 | 12/2010 | Hatada | |

FOREIGN PATENT DOCUMENTS

| | | |
|---|---|---|
| CA | 2697652 A1 | 3/2009 |
| CN | 1964121 A | 5/2007 |
| CN | 101099256 A | 1/2008 |
| EP | 1840997 A1 | 10/2007 |
| JP | 2005-005213 A | 1/2005 |
| JP | 2005-285648 A | 10/2005 |
| JP | 2009-032555 A | 2/2009 |

OTHER PUBLICATIONS

Extended European Search Report for European Application No. 10181547.0, dated Jan. 26, 2011, 6 pages.

\* cited by examiner

*Primary Examiner* — Jane Rhee
(74) *Attorney, Agent, or Firm* — Brinks Hofer Gilson & Lione

(57) ABSTRACT

The present invention is a solid oxide fuel cell device (1), having a fuel cell module (2) furnished with a plurality of fuel cell units (16); fuel supply means (38) for supplying fuel; generating oxidant gas supply means (45) for supplying oxidant gas for generation; combustion section placed at one end portion of the solid oxide fuel cell units for combusting fuel; and control means for controlling the fuel supply means and generating oxidant gas supply means, and executing the startup mode operation for raising the solid oxide fuel cell units to a predetermined temperature, as well as the generating mode operation for outputting electrical power; whereby during the startup mode operation, the control means generates a weak power smaller than the generation startup power, raising the temperature of the solid oxide fuel cell units by the heat of generation.

8 Claims, 8 Drawing Sheets

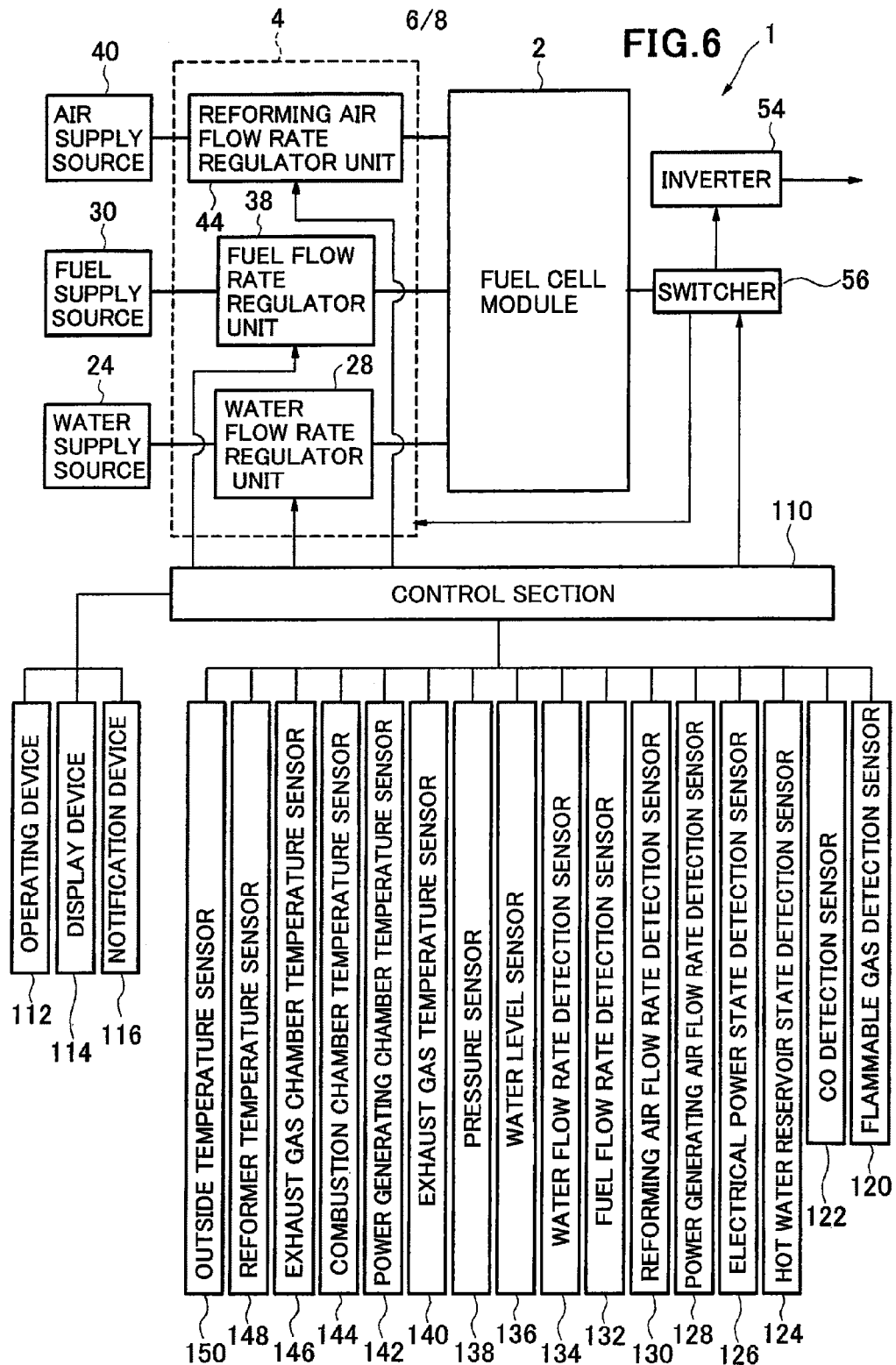

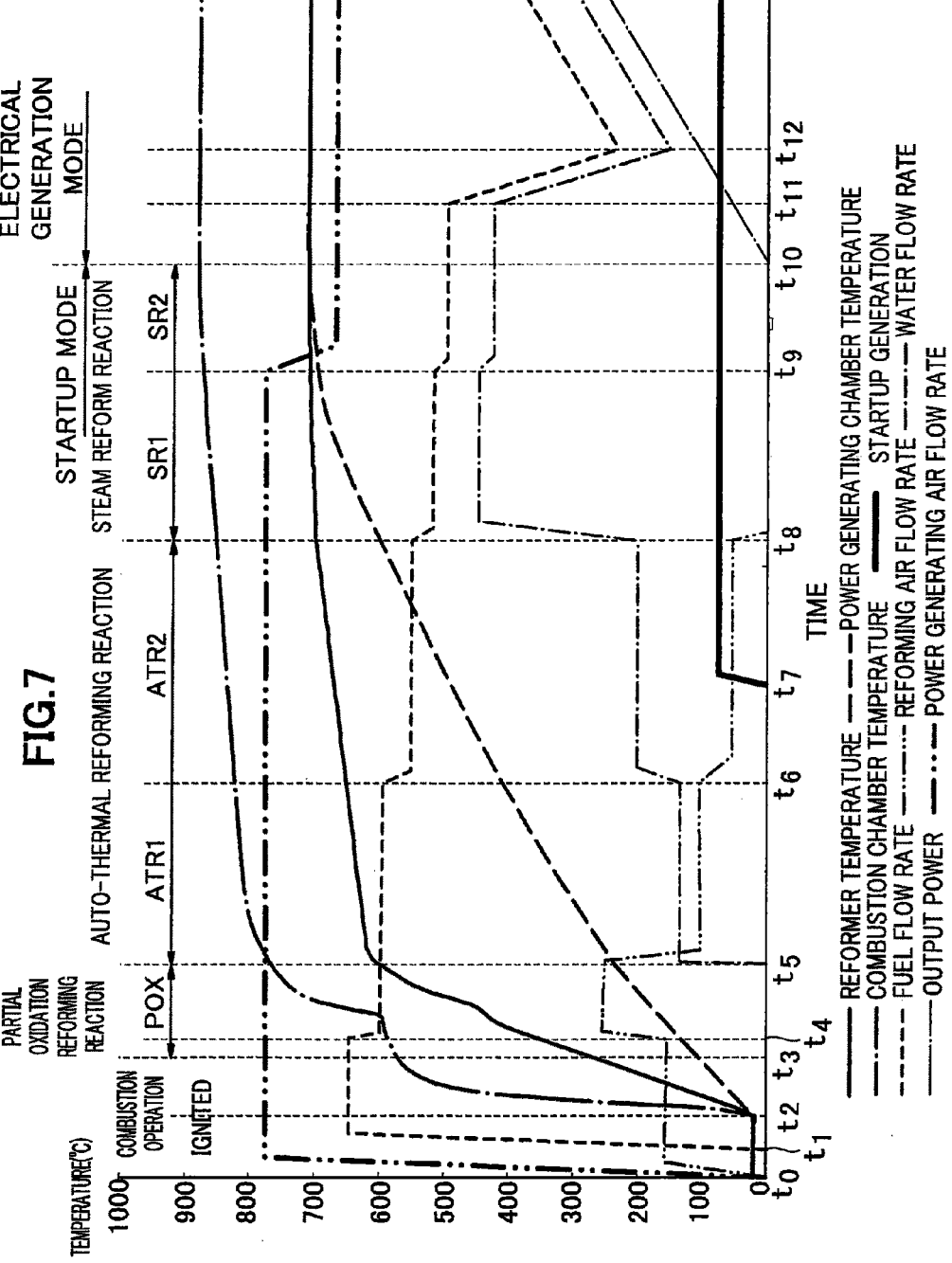

FIG.8

| MODE | STATE | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION(°C) REFORMER | TEMPERATURE CONDITIONS FOR TRANSITION(°C) STACK | TEMPERATURE CONDITIONS FOR TRANSITION(°C) EVAPORATING SECTION | TYPE OF POWER GENERATION |
|---|---|---|---|---|---|---|---|---|---|
| STARTUP MODE | COMBUSTION OPERATION | 6.0 | 10.0 | 100.0 | 0.0 | 300°C OR ABOVE | – | – | – |
| | POX1 | 6.0 | 10.0 | 100.0 | 0.0 | 350°C OR ABOVE | – | – | – |
| | POX2 | 5.0 | 18.0 | 100.0 | 0.0 | 600°C OR ABOVE | 250°C OR ABOVE | – | – |
| | ATR1 | 5.0 | 8.0 | 100.0 | 2.0 | 600°C OR ABOVE | 400°C OR ABOVE | 100°C OR ABOVE | – |
| | ATR2 | 4.0 | 4.0 | 100.0 | 3.0 | 650°C OR ABOVE | 600°C OR ABOVE | 100°C OR ABOVE | |
| | SR1 | 3.0 | 0.0 | 100.0 | 8.0 | 650°C OR ABOVE | 650°C OR ABOVE | 100°C OR ABOVE | STARTUP GENERATION BEGINS AT THE TEMPERATURE OF THE STACK 500°C. NO OUTPUTTING POWER TO EXTERNAL LOAD |
| | SR2 | 2.9 | 0.0 | 80.0 | 6.3 | 650°C OR ABOVE | 700°C OR ABOVE | 100°C OR ABOVE | SUPPLYING FIXED POWER TO AUXILIARY UNIT |
| ELECTRICAL GENERATION MODE | CURRENT 7A | 2.8 | 0.0 | 60.0 | 6.0 | – | | | |
| | CURRENT 6A | 2.6 | 0.0 | 50.0 | 5.8 | – | | | SUPPLYING POWER TO EXTERNAL LOAD |
| | CURRENT 5A | 2.3 | 0.0 | 42.0 | 5.5 | – | | | |
| | CURRENT 4A | 1.9 | 0.0 | 35.0 | 4.5 | – | | | |
| | CURRENT 3A | 1.7 | 0.0 | 30.0 | 4.0 | – | | | LOAD FOLLOWING OPERATION |
| | CURRENT 2A | 1.5 | 0.0 | 26.0 | 3.5 | – | | | |

SOLID OXIDE FUEL CELL DEVICE

RELATED APPLICATIONS

This application claims priority under 35 U.S.C. §119 to Japanese Patent Application Nos. 2009-227347 filed on Sep. 30, 2009 and 2010-179313 filed on Aug. 10, 2010, the entire contents of which are hereby incorporated by reference.

TECHNICAL FIELD

The present invention relates to a gas meter for measuring gas usage flow rate and to a gas security system incorporating this gas meter.

BACKGROUND ART

Solid oxide fuel cell device ("SOFC" below) are fuel cell device which operate at relatively high temperatures, using an oxide ion-conducting solid electrolyte as electrolyte, with electrodes placed on each side thereof, and with fuel gas supplied to one side thereof and oxidizer (air, oxygen, or the like) supplied to the other side thereof.

In such SOFCs, steam or $CO_2$ is produced by the reaction between oxygen ions passed through the oxide ion-conducting solid electrolyte and fuel, thereby generating electrical and thermal energy. The electrical energy is extracted from the SOFC, where it is used for various electrical purposes. At the same time, the thermal energy is transferred to the fuel, the SOFC, the oxidizer, and the like, and is used to raise the temperature thereof.

Laid Open Unexamined Patent 2005-5213 (Patent Document 1) discloses a electrical generating/hot water supplying cogeneration system. In that fuel cell device, a long cell stack is stacked vertically; this is supplied with fuel gas and oxygen-containing gas. These gases react in the cell stack to produce electricity. Fuel gas and oxygen-containing gas not used in the reaction are combusted at the top end portion of the cell stack, and this heat of combustion is used to heat items such as the converter and the cell stack.

Laid Open Unexamined Patent 2009-32555 (Patent Document 2) discloses a fuel cell device. In this fuel cell device, during startup processing a converter for supplying fuel gas and the fuel cell units themselves heat up to a predetermined temperature. Also during startup processing, switching between a partial oxidation reforming method (POX), an autothermal reforming method (ATR), and a steam reforming method (SR) is implemented as the temperature rises within the reformer, thereby reforming the fuel.

Furthermore, in the fuel cell device set forth in JP-A-2009-32555, electrical generation by the cell stack is begun when the cell stack temperature reaches a temperature at which electrical generation can be started. Electrical generation is thus started when the cell stack is sufficiently heated and in a stable state.

Patent Document 1: Laid Open Unexamined Application 2005-5213

Patent Document 2: Laid Open Unexamined Application 2009-32555

However, in fuel cell units in which fuel not used to generate electricity is combusted at one end portion of the fuel cell units, as in the solid oxide fuel cell device disclosed in Laid Open Unexamined Application 2005-5213, the problem arises that in fuel cell units heated by this combustion heat, it is difficult to heat portions which are separated from the fuel cell combustion section. In other words, in fuel cell units in which fuel is combusted at the top end portion of a fuel cell units, as in the solid oxide fuel cell device disclosed in Laid Open Unexamined Application 2005-5213, the problem arises that in the fuel cell units heated by this combustion heat, it is difficult to heat the lower portion of the fuel cell units, and temperature unevenness can easily arise within each fuel cell unit. This temperature unevenness is especially problematic with elongated fuel cell units.

During the interval between the startup of the fuel cell device and the commencement of electrical generation, in fuel cell device wherein fuel supplied to the fuel cell units is combusted to heat the temperature of the fuel cell units to a temperature at which electrical generation can take place, the problem occurs that a long period of time is needed until the temperature state of the fuel cell units is sufficiently stable. In other words, in fuel cell units in which one end portion of the fuel cell units is intensively heated, a long period of time is required until all the fuel cell units heat up sufficiently without any unevenness, meaning that a long period of time is required after startup until electrical generation can commence.

Therefore the present invention has the object of providing a solid oxide fuel cell device capable of commencing electrical generation in a sufficiently stable state while shortening the time required from startup until the start of electrical generation.

SUMMARY OF THE INVENTION

In order to resolve the problems above, the present invention is a solid oxide fuel cell device for generating electricity by reacting fuel and electrical generation oxidant gas, comprising: a fuel cell module furnished with multiple solid oxide fuel cell units; a reformer for producing hydrogen by POX, which is a reforming reaction for partial oxidation reforming of fuel by chemically reacting fuel and oxidant gas, by SR, which is a reforming reaction for steam reforming of fuel by chemically reacting fuel and steam, and by ATR, which is a reforming reaction for autothermal reforming of fuel by simultaneously inducing the above partial oxidation reforming and steam reforming; fuel supply means for feeding fuel reformed in the reformer to the solid oxide fuel cell units by supplying fuel to this reformer; reforming oxidant gas supply means for supplying oxidant gas for reforming to the reformer; steam supply means for supplying steam for reforming to the reformer; electrical generation oxidant gas supply means for supplying oxidant gas for electrical generation to the solid oxide fuel cell units; a combustion section placed at one end portion of the solid oxide fuel cell units for combusting fuel not used in electrical generation; and control means for controlling the fuel supply means, the reforming oxidant gas supply means, the steam supply means, and the electrical generation oxidant gas supply means; wherein in a predetermined temperature range, the control means executes a startup mode operation in which the reforming reaction is induced in the order of POX, ATR, and SR inside the reformer to heat the solid oxide fuel cell units until they reach an electrical generating startup temperature at which electrical power can be extracted from the fuel cell module, and executes a generating mode operation, whereby the startup mode operation is ended when the electrical generating startup temperature is exceeded, and electrical power is extracted from the fuel cell module; and during the startup mode operation prior to reaching the electrical generating startup temperature, the control means executes startup electrical generation to cause the solid oxide fuel cell units to produce a generating heat and raise the temperature of the solid oxide fuel cell units by extracting from the fuel cell module a weak electrical power, smaller than the power extracted from the fuel cell module during generating mode operation.

In the present invention thus constituted, the control means controls fuel supply means, reform oxidant gas supply means, steam supply means, and generating oxidant gas supply means to supply fuel and generating oxidant gas to the solid oxide fuel cell units. Fuel not used to generate electricity is combusted in the combustion section, and the solid oxide fuel cell units are heated at one end portion. In a predetermined temperature range, the control means executes a startup mode operation, whereby the reforming reaction is induced in the order of POX, ATR, and SR inside the reformer, and the solid oxide fuel cell units are heated until they reach an electrical generating startup temperature at which electrical power can be extracted from the fuel cell module, as well as a generating mode operation, whereby the startup mode operation is ended when the electrical generating startup temperature is exceeded, and electrical power is extracted from the fuel cell module. During the startup mode operation prior to reaching the electrical generating startup temperature, the control means executes startup electrical generation to cause the solid oxide fuel cell units to produce a generating heat and raise the temperature of the solid oxide fuel cell units by extracting from the fuel cell module a weak electrical power, smaller than the power extracted from the fuel cell module during generating mode operation.

In the present invention thus constituted, the weak power is extracted from the fuel cell module by executing startup electrical generation at the stage when the solid oxide fuel cell units have not yet sufficiently heated up during the startup mode operation, so that heating of the solid oxide fuel cell units can be promoted by this electrical generating heat. Moreover, while the heating of the solid oxide fuel cell units by combustion of fuel in the combustion section is carried out on one end thereof, electrical generating heat is notably created in the middle portion of the solid oxide fuel cell units by startup generation. Since heating is performed in the present invention by startup electrical generation in addition to heating by the combustion section, temperature unevenness within each solid oxide fuel cell unit can be suppressed. When electrical generation occurs while the solid oxide fuel cell units are in a low temperature state, degradation of the solid oxide fuel cell units speeds up enormously, and may result in breakage. In the present invention, electrical generation by startup generation extracts a weak electrical power, therefore degradation of the solid oxide fuel cell units does not speed up enormously even if electrical power is extracted from the fuel cell module prior to the solid oxide fuel cell units reaching the electrical generation startup temperature, and breakage does not occur.

In the present invention, the weak electrical power extracted from the fuel cell module during the startup electrical generation is preferably an approximately constant electrical power.

In the present invention thus constituted, the weak electrical power extracted during startup generation is an approximately fixed electrical power, so there is no need to greatly vary the amounts of fuel, steam, and the like supplied in order to implement startup generation, and fuel, steam, and the like can be stably supplied. Damage to the solid oxide fuel cell units in which electrical generation is carried out in a state in which sufficient quantities of hydrogen are not being supplied (known as "hydrogen depletion") can thus be prevented, and startup electrical generation can be executed.

In the present invention the control means preferably commences the startup electrical generation after the commencement of reforming by ATR in the reformer during the startup mode operation.

In the present invention thus constituted, reforming efficiency in the reformer is high, and startup generation is commenced after ATR, in which steam reforming commences and produces sufficient hydrogen, so there is no risk of hydrogen depletion even if electrical generation is undertaken before the solid oxide fuel cell units reach the generation startup temperature. Furthermore, in the POX, which occurs before the ATR, high temperature hydrogen produced by the partial oxidation reforming reaction, which is an exothermal reaction, is supplied to the solid oxide fuel cell units, and the solid oxide fuel cell units are heated. Therefore after reforming by the ATR commences inside the reformer, the solid oxide fuel cell units rise in temperature until extraction of a weak electrical power poses no problem, and damage to the solid oxide fuel cell units by electrical generation can be reliably prevented.

In the present invention the control means preferably brings about, as ATR reforming inside the reformer, an ATR1, in which the amount of steam supplied to the reformer is small, and an ATR2 performed after the ATR1, in which the amount of steam supplied is greater than in the ATR1; and the startup electrical generation is commenced after the commencement of the ATR2 reforming.

In the present invention thus constituted, startup generation is commenced in the reformer after the ATR2, in which a greater amount of steam reforming takes place, therefore hydrogen depletion can be more reliably avoided, and damage to the solid oxide fuel cell units can be reliably prevented.

In the present invention the control means preferably commences the startup electrical generation after the commencement of reforming by the SR inside the reformer.

When transitioning from the ATR to the SR, the partial oxidation reforming reaction inside the reformer ends and the endothermic steam reforming reaction increases, so the solid oxide fuel cell units may also drop in temperature along with the reformer. In the present invention thus constituted, startup generation commences when reforming by SR begins, at which time the temperature can easily drop, or after a predetermined time following the commencement of reforming by SR. Startup generation thus commences together with the startup of the SR, when the temperature can easily drop, or after a predetermined time has elapsed following the commencement of SR reforming such that the reforming reaction inside the reformer has stabilized, therefore the drop in temperature in the solid oxide fuel cell units can be suppressed, and startup generation is implemented prior to reaching the generation startup temperature.

In the present invention the control means preferably causes to output electrical power extracted from the fuel cell module during the generating mode operation to outside the solid oxide fuel cell device, while the weak electrical power extracted from the fuel cell module during the startup mode operation is not output to outside the solid oxide fuel cell device.

In general, electrical power output to outside the solid oxide fuel cell device fluctuates continually with fluctuations in power demand. In the present invention thus constituted, the weak electrical power produced by startup generation in the startup mode operation is not output to outside the solid oxide fuel cell device, therefore breakage of solid oxide fuel cell units caused by fluctuations in electrical power extracted from the fuel cell module due to the adverse effects of power demand fluctuations at startup generation can be prevented.

The present invention is preferably further comprising an auxiliary device for operating the fuel cell module, and all of the weak electrical power extracted from the fuel cell module during the startup mode operation is consumed by this auxiliary device.

The auxiliary device is controlled and operated by the control means so as to operate the fuel cell module. In the present invention thus constituted, the weak electrical power from startup generation is consumed by the auxiliary device controlled by the control means, so there is no fluctuation in the consumed power due to external factors, and the power generated during startup generation can thus be stabilized. Damage to the solid oxide fuel cell units can thus be prevented and startup generation effected.

In the present invention the electrical generating startup temperature is preferably set to 600° C. or above; during the startup mode operation the control means commences the startup electrical generation when the temperature of the solid oxide fuel cell units has reached a temperature greater than 500° C. and less than 600° C.

In the present invention thus constituted, during the startup mode operation startup generation is commenced at a temperature greater than 500° C. and less than 600° C., at which the steam reforming reaction is stable inside the reformer, therefore heating by the heat of electrical generation can be effected while reliably preventing breakage of the solid oxide fuel cell units.

The present invention is a solid oxide fuel cell device for generating electricity by reacting fuel and electrical generation oxidant gas, comprising: a fuel cell module furnished with multiple solid oxide fuel cell units; a reformer for producing hydrogen by POX, which is a reforming reaction for partial oxidation reforming of fuel by chemically reacting fuel and oxidant gas, by SR, which is a reforming reaction for steam reforming of fuel by chemically reacting fuel and steam, and by ATR, which is a reforming reaction for autothermal reforming of fuel by simultaneously inducing the above partial oxidation reforming and steam reforming; a fuel flow amount regulator unit for feeding fuel reformed in the reformer to the solid oxide fuel cell units by supplying fuel to this reformer; a reforming air flow amount regulator unit for supplying oxidant gas for reforming to the reformer; a water flow amount regulator unit for supplying steam for reforming to the reformer; a generating air flow amount regulator unit for supplying oxidant gas for electrical generation to the solid oxide fuel cell units; a combustion section placed at one end portion of the solid oxide fuel cell units, for combusting fuel not used in electrical generation; and a control unit for controlling the fuel flow amount regulator unit, the reforming air flow amount regulator unit, the water flow amount regulator unit, and the generating air flow amount regulator unit; wherein in a predetermined temperature range, the control unit executes a startup mode operation in which the reforming reaction is induced in the order of POX, ATR, and SR inside the reformer to heat the solid oxide fuel cell units until they reach an electrical generating startup temperature at which electrical power can be extracted from the fuel cell module, and executes a generating mode operation, whereby the startup mode operation is ended when the electrical generating startup temperature is exceeded, and electrical power is extracted from the fuel cell module; during the startup mode operation prior to reaching the electrical generating startup temperature, the control unit executes startup electrical generation to cause the solid oxide fuel cell units to produce a generating heat and raise the temperature of the solid oxide fuel cell units by extracting from the fuel cell module a weak electrical power, smaller than the power extracted from the fuel cell module during generating mode operation.

BRIEF DESCRIPTION OF THE DRAWINGS

FIG. 6 is a block diagram showing a solid oxide fuel cell device (SOFC) according to an embodiment of the present invention.

FIG. 7 is a block diagram showing a solid oxide fuel cell device (SOFC) according to an embodiment of the present invention.

FIG. 8 is an operation table showing examples of solid oxide fuel cell device startup mode operation and generating mode operation in an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
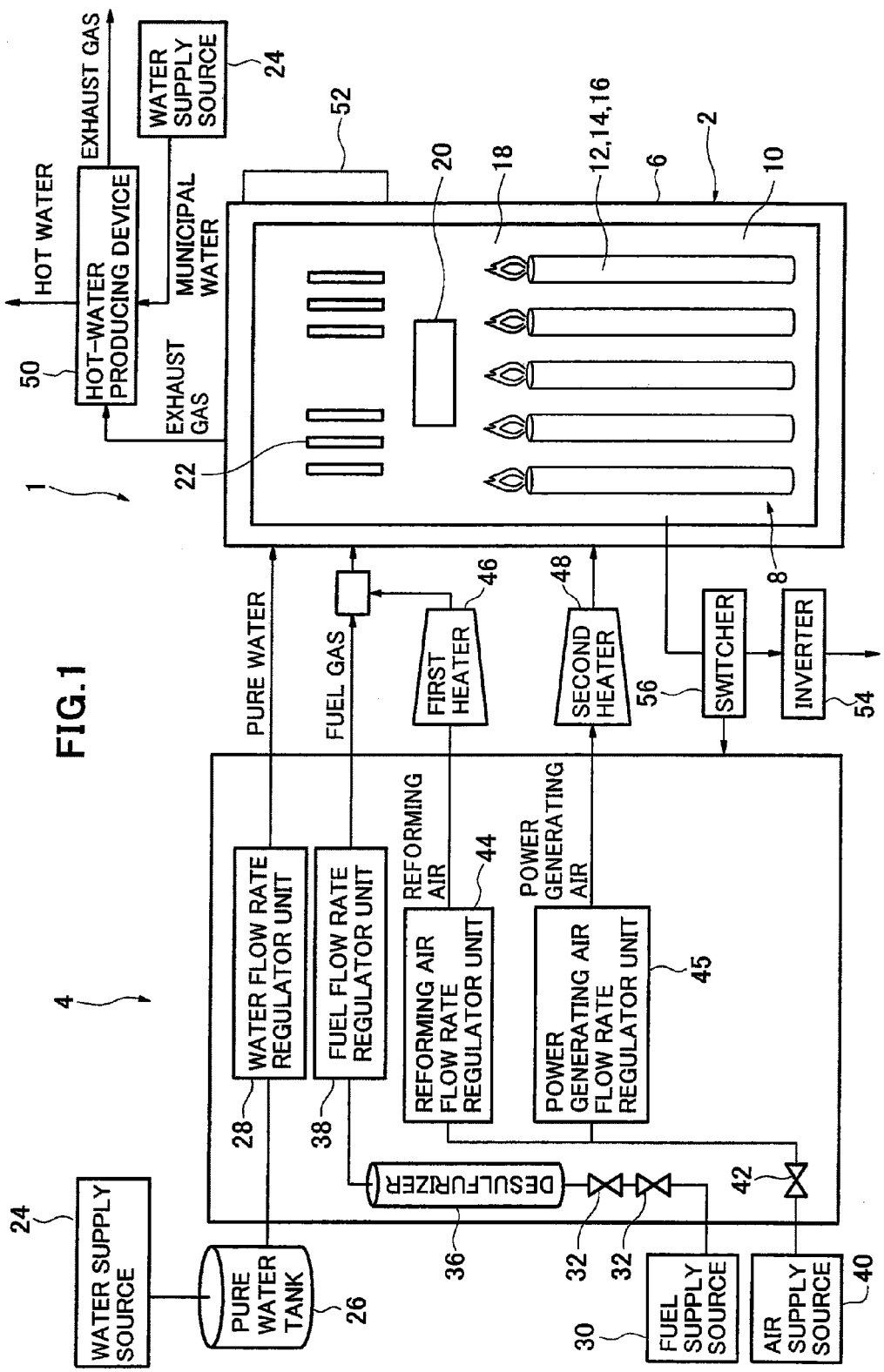
FIG. 1 is an overview diagram showing a solid oxide fuel cell device (SOFC) according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside and a switcher 56 for switching the generated electrical power to supply to the auxiliary unit 4 or the inverter 54 are connected to the fuel cell module 2.

Figure 2:
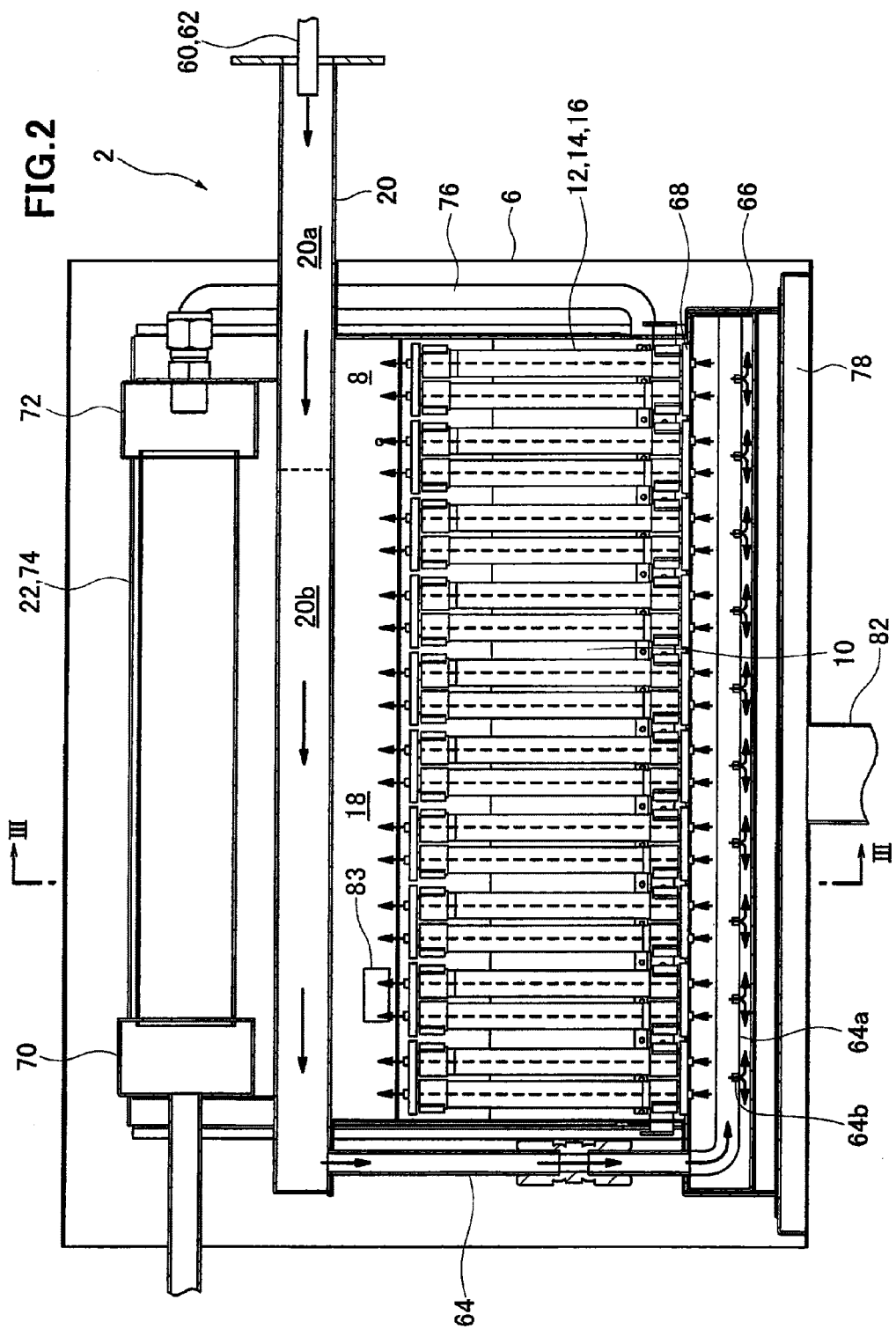
FIG. 2 is a front elevation cross section showing a fuel cell module (SOFC) in a solid oxide fuel cell device according to an embodiment of the present invention.
Figure 3:
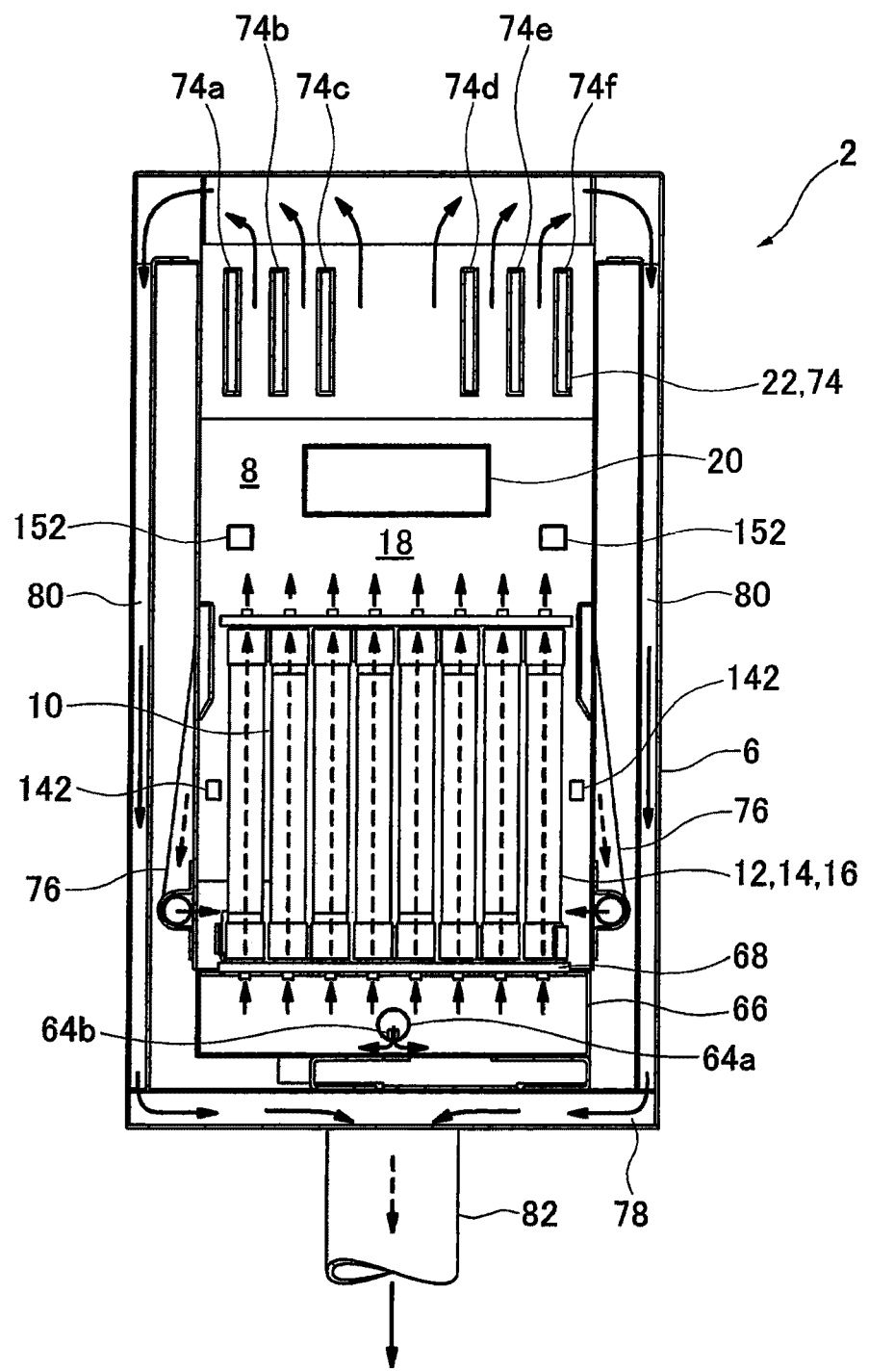
FIG. 3 is a cross section along line in FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
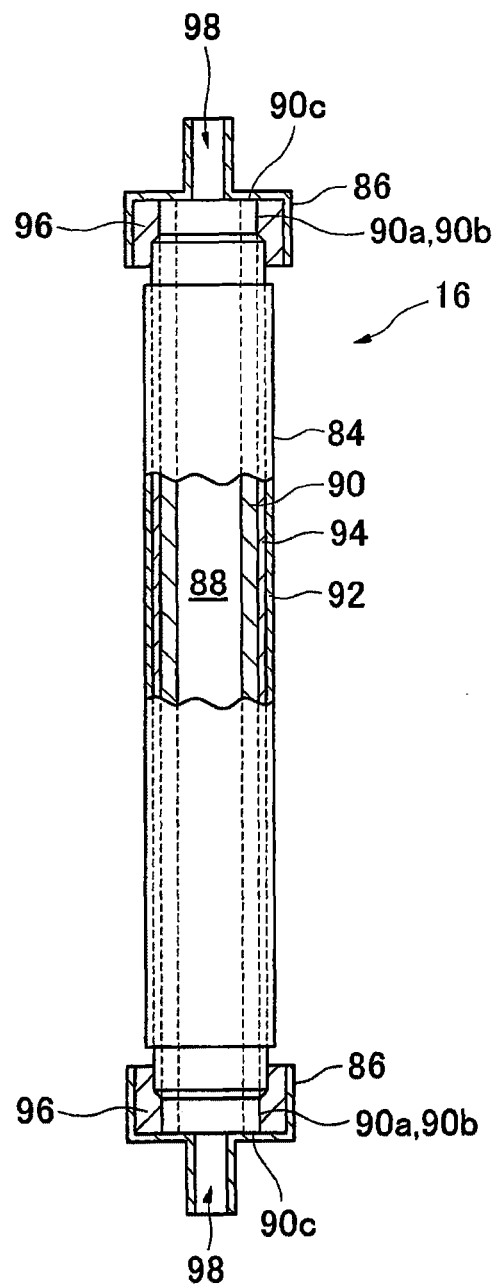
FIG. 4 is a partial cross section showing an individual cell of a fuel cell in a solid oxide fuel cell device (SOFC) according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
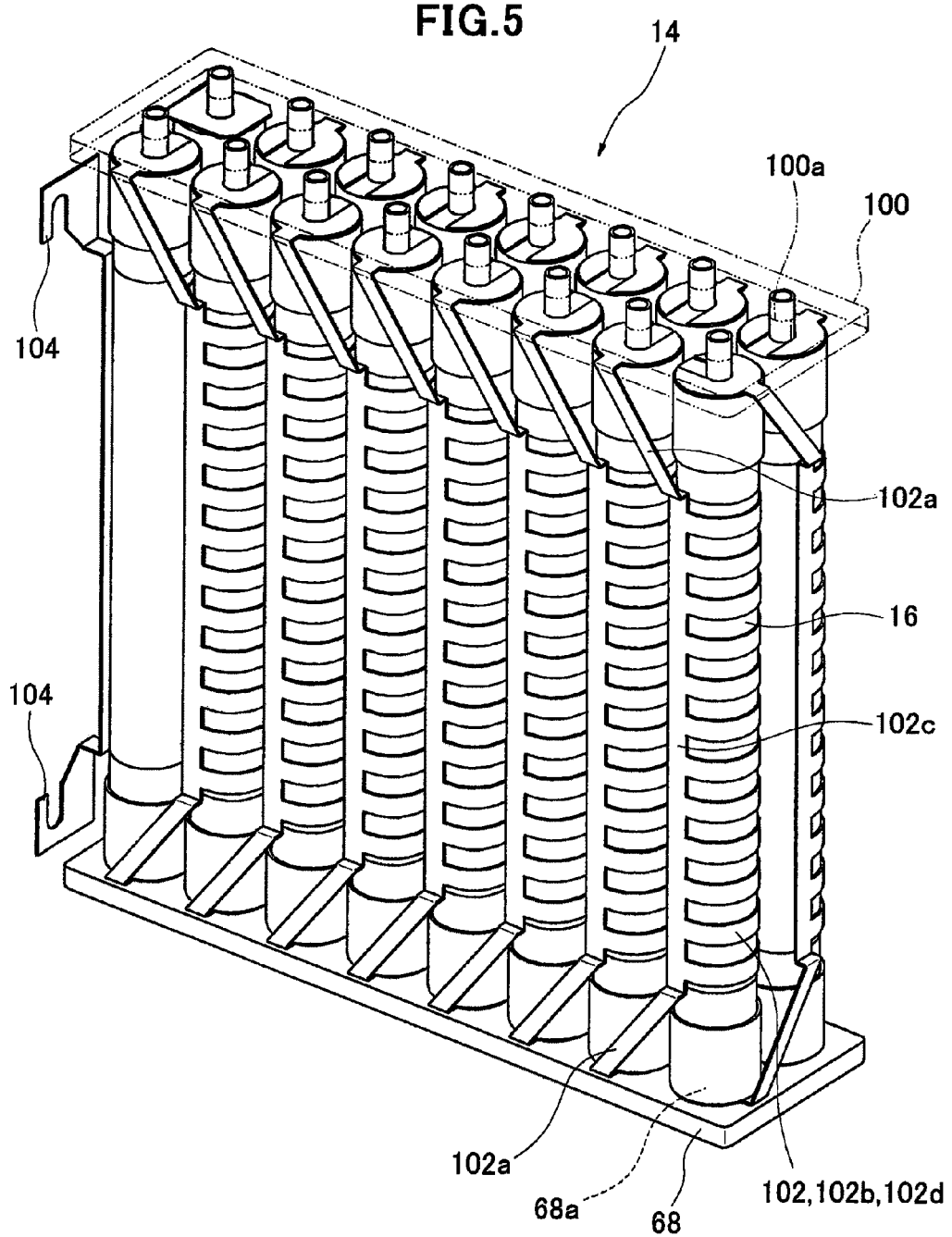
FIG. 5 is a perspective view showing a fuel cell stack in a solid oxide fuel cell device (SOFC) according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the switcher 56 and the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The temperature of the combustion chamber 18 has risen by the combustion of the fuel gas and air, and the fuel cell stack 14 is therefore heated from the upper side such that the temperature of the fuel cell stack 14 can be raised. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \quad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. Also, the combustion reaction continues within the combustion chamber 18 even as the auto-thermal reforming reaction ATR proceeds.

Following the start of the auto-thermal reforming reaction ATR shown as Expression (2), the supply of reforming air by the reforming air flow rate regulator unit 44 is stopped, and the supply of steam by the water flow rate regulator unit 28 is increased based on the temperature of the reformer 20 detected by the reformer temperature sensor 146. By this means, a gas containing no air and only containing fuel gas and steam is supplied to the reformer 20, where the steam reforming reaction SR of Expression (3) proceeds.

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction, therefore the reaction proceeds as a thermal balance is maintained with the heat of combustion from the combustion chamber 18. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. After the aforementioned startup processing is completed, electrical power is extracted at the inverter 54 from the fuel cell module 2. In other words, electrical generation is started. Generation of electricity by the fuel cell module 2 causes the fuel cell 84 itself to emit heat, such that the temperature of the fuel cell 84 rises.

Even after the startup of electrical generation, an amount of fuel gas and air greater than that consumed by the fuel cell 84 is applied in order to maintain the temperature of the reformer 20 and continue combustion inside the combustion chamber 18. Generation of electricity by the high reform-efficiency steam reforming reaction SR proceeds while electricity is being generated. Details of the startup mode operation above are discussed in detail below.

Next we discuss the load following operation during the electrical generation mode operation of the solid oxide fuel cell device 1 of the present embodiment of the invention.

In the electrical generating mode operation following the startup mode operation (after time t10 in FIG. 7), the solid oxide fuel cell device 1 implements a load following operation so that an output power can be obtained from the inverter 54 (FIG. 6) in a response to a required power. As shown in FIG. 6, that is, the control section 110 serving as control means sends control signals to the fuel flow regulator unit 38 serving as fuel supply means, the generating air flow regulator unit 45 serving as oxidant gas supply means, and the water flow regulator unit 28 serving as steam supply means in response to the amount of generated power required from the inverter 54 to supply the requisite flow amounts of fuel, air, and water to the fuel cell module 2. The output power from the solid oxide fuel cell device 1 thus changes so as to follow the amount of required power from the inverter 54.

Here, stable generating mode operation is difficult if the fuel supply amount or the like is suddenly caused to change, so operation is conducted in such a way that the amount of fuel supplied is smoothly varied. For this reason, output power response changes with required power after a delay, without causing sudden following of output power, even if sudden changes in required power occur. In the solid oxide fuel cell device 1 of the embodiment, the maximum rate of increase in output power in the electrical generating mode operation is set at 200 W/min.

Next, referring to FIG. 8 and again to FIG. 7, we will discuss in detail the startup mode operation of the solid oxide fuel cell device 1 according to an embodiment of the present invention.

FIG. 8 is an operation table showing the order of processing of the startup mode operation by the solid oxide fuel cell device 1.

When the solid oxide fuel cell device 1 startup mode operation is commenced at time t0 in FIG. 7, the control unit 110 sends a signal to the reforming air flow regulator unit 44 serving as the reforming oxidant gas supply means, and to the generating air flow regulator unit 45 serving as the generating oxidant gas supply device, thereby starting those devices and supplying reforming air and generating air to the fuel cell module 2. Note that in the present embodiment, the amount of reforming air supplied when supply begins at time t0 is set at 10 L/min, and the amount of generating air supplied is set at 100 L/min.

Next, at time t1, the control section 110 sends signals to the fuel flow regulator unit 38 serving as fuel supply means, and starts the supply of fuel to the reformer 20. Fuel and reforming air fed into the reformer 20 are thus fed into each of the fuel cell units 16 via the fuel gas supply lines 64 and the manifold 66. Fuel and reforming air fed into each of the fuel cell units 16 are respectively flowed out from the top ends of the fuel gas conduits 98 on each of the fuel cell units 16. Note that in the present embodiment, the amount of fuel supplied when supply begins at time t1 is set at 6 L/min (the "fuel operation" state in FIG. 8).

In addition, at time t2, the control unit 110 sends a signal to the ignition device 83, igniting the fuel flowing out of the top end of the fuel cell units 16. Fuel is thereby combusted in the combustion section of the combustion chamber 18, and the elongated fuel cell units 16 are heated from above by the heat of combustion. The reformer 20 disposed above the fuel cell units 16 is heated, and the temperature of the combustion chamber 18 and the generating chamber 10 also rises (times t2-t3 in FIG. 7). A partial oxidation reforming reaction (POX) occurs when the temperature of the reformer 20 rises to approximately 300° C. as a result of heating the reformer 20 (time t3 in FIG. 7). Since the partial oxidation reforming reaction is an exothermic reaction, the reformer 20 is heated by the heat of the partial oxidation reforming reaction (the "POX1" state in FIG. 8).

When the temperature rises further and the temperature of the reformer 20 reaches 350° C., the control unit 110 sends a signal to the fuel flow regulator unit 38 reducing the amount of fuel supplied, while at the same time sending a signal to the reforming air flow regulator unit 44 to increase the supply amount of reforming air (time t4 in FIG. 7). This results in a change in the amount of fuel supply to 5 L/min and in the amount of reforming air supplied to 18 L/min (the "POX2" state in FIG. 8). This amount of supply is an appropriate supply amount for inducing a partial oxidation reforming reaction. That is, in the initial temperature region at which the partial oxidation reforming reaction begins to occur, conditions are formed for reliable ignition of the fuel by increasing the proportion of fuel supplied, and that supply amount is maintained to stabilize ignition (the "POX1" state in FIG. 8). Moreover, after stable ignition and a rise in temperature, fuel waste is suppressed by using a fuel supply amount sufficient to produce a partial oxidation reaction (the "POX2" state in FIG. 8).

Next, at time t5 in FIG. 7, when the temperature of the reformer 20 reaches 600° C. or above and the temperature of the fuel cell units 16 reaches 250° C. or above, the control unit 110 sends a signal to the reforming air flow regulator unit 44, reducing the amount of reforming air supply, and sends a signal to the water flow regulator unit 28 serving as water supply means, starting the supply of water. This results in a change in the amount of reforming air supply to 8 L/min and in the amount of water supplied to 2 cc/min (the "ATR1" state in FIG. 8). The steam reforming reaction is also caused to occur in the reformer 20 by the introduction of water (steam) into the reformer 20. In other words, in the "ATR1" state in FIG. 8, an auto-thermal reforming reaction (ATR) takes place, which is a blend of the partial oxidation reforming reaction and the steam reforming reaction.

In the present embodiment, the temperature of the fuel cell units 16 is measured by a generating chamber temperature sensor 142, which is a temperature detection means disposed inside the generating chamber 10. The temperature inside the generating chamber and the temperature of the fuel cell units are not, precisely speaking, identical, but the temperature detected by the generating chamber temperature sensor reflects the temperature of the fuel cell units, and the temperature of the fuel cell units can be grasped by the temperature of the generating chamber temperature sensor inside the generating chamber. Note that in the present specification, the term "fuel cell unit temperature" means a temperature measured by any preferred sensor which indicates a value reflecting the temperature of the fuel cell units.

Furthermore, at time t6 in FIG. 7, when the temperature of the reformer 20 reaches 600° C. or above and the temperature of the fuel cell units 16 reaches 400° C. or above, the control unit 110 sends a signal to the fuel flow regulator unit 38 to reduce the amount of fuel supplied. The control unit 110 also sends a signal to the reforming air flow regulator unit 44 to reduce the amount of reforming air supplied, and sends a signal to the water flow regulator unit 28 to increase the amount of water supplied. This results in a change in the amount of fuel supply to 4 L/min, a change in the amount of reforming air supplied to 4 L/min, and a change to a water supply amount of 3 cc/min (the "ATR2" state in FIG. 8). The decrease in the amount of reforming air supplied and the increase in the amount of water supplied results in a decrease in the proportion of the partial oxidation reforming reaction and an increase in the proportion of the steam reforming reaction within the reformer 20.

Next, at time t7 in FIG. 7, when the temperature of the fuel cell units 16 reaches 500° C. or above, the control section 110 sends a signal to the switcher 56, switching the switcher 56. This causes startup generation to begin, and a small amount of power to be supplied from the fuel cell module 2 to the auxiliary unit 4 (the "form of generation" column in FIG. 8). The weak power extracted by startup electrical generation is used as electrical power to operate the devices built in to the auxiliary unit, i.e. the water flow regulator unit 28, the fuel flow regulator unit 38, the reforming air flow regulator unit 44, and the generating air flow regulator unit 45. In the present embodiment, all power to operate the auxiliary unit 4 is supplied from grid power until supply of electrical power by startup generation commences.

The amount of fuel and the amount of generating air supplied to the fuel cell module 2 are maintained at the same amounts as before the start of startup generation. It is also acceptable to increase the amounts of fuel supplied and generating air supplied in response to the amount used to execute startup generation.

In the present embodiment, power from startup generation is approximately a fixed 50 W; this power is entirely used to operate the auxiliary unit 4, and is not output outside the solid oxide fuel cell device 1. At generation startup, this power from startup generation should be set to a sufficiently smaller value than the generating capacity (rated power) of the fuel cell module 2; it is preferably set at approximately $\frac{1}{10}$ to $\frac{1}{30}$ of rated power. Therefore power from startup generation differs from the output power of the solid oxide fuel cell device 1, which is output to outside the solid oxide fuel cell device 1. Once power from startup generation is supplied to the auxiliary unit 4, electrical generation by the fuel cell units 16 is started. Note that in the present embodiment, power from the startup generation reaches a fixed value of 50 W in approximately 0.5 sec, since it is increasing at a rate of approximately 100 W/sec starting from the generation of startup generation power at time t7. Power from startup generation is thus increased at a rate of increase far larger than the rate of increase in power during load following.

Once startup generation is commenced, current flows into the fuel cell units 16 and joule heat is produced by the internal resistance of the fuel cell units 16. The fuel cell units 16 are thus heated by their own heat created by the flow of current in the fuel cell units 16, in addition to the heat of combustion caused by the combustion of fuel flowing out from the top ends.

The self-heating of the fuel cell units 16 becomes large in the middle portion of the fuel cell units 16, and the middle portion of the fuel cell units 16 are particularly strongly heated. In addition to being heated from above by the heat of fuel combustion, the temperature of the fuel cell units 16 is more uniformly raised by the self heat-heating of the middle portion of the fuel cell units 16.

Next, at time t7 in FIG. 8, when the temperature of the reformer 20 reaches 650° C. or above and the temperature of the fuel cell units 16 reaches 600° C. or above, the control unit 110 sends a signal to the reforming air flow regulator unit 44, stopping the supply of reforming air. The control unit 110 also sends a signal to the fuel flow regulator unit 38 reducing the amount of fuel gas supplied, and sends a signal to the water flow regulator unit 28 increasing the amount of water supplied. This results in a change in the amount of fuel supplied to 3 L/min and in the amount of water supplied to 8 cc/min (the "SR1" state in FIG. 8). Stopping the supply of reforming air stops the partial oxidation reaction in the reformer 20 so that the SR is started, in which only the steam reforming reaction occurs. Note that the rise in temperature by startup generation continues on even after transition to SR1.

Furthermore, at time t9 in FIG. 7, when the temperature in the reformer 20 reaches 650° C. or above and the temperature in the fuel cell units 16 reaches 650° C. or above, the control unit 110 sends a signal to the fuel flow regulator unit 38 to reduce the amount of fuel gas supplied, and sends a signal to the water flow regulator unit 28 to reduce the amount of water supplied. The control unit 110 also sends a signal to the generating air flow regular unit 45 to reduce the amount of generating air supplied. The amount of fuel supplied is thus changed to the electrical generation standby fuel supply amount, which is 2.9 L/min; the water supply amount is changed to 6.3 cc/min, and the generating air supply amount is changed to 80 L/min (the "SR2" state in FIG. 8).

Next, at time t10 in FIG. 7, when the temperature of the reformer 20 reaches 650° C. or above and the temperature of the fuel cell units 16 reaches the 700° C. at which generation of a predetermined generation startup power is possible, the control unit 110 commences the generating mode operation of the solid oxide fuel cell device 1. When the generating mode operation is started, the control section 110 sends a signal to the switcher 56, switching the switcher 56. This causes current to flow from the fuel cell module 2 to the auxiliary unit 4 and the inverter 54 (the "form of generation" column in FIG. 8). Note that in this embodiment the generation startup power is set at the rated output power of 700 W. That is, the control section 110 starts the generating mode operation when the fuel cell module 2 reaches a state at which the rated output power can be obtained.

When the generating mode operation is started at time t10, current flows from the fuel cell module 2 to the inverter 54 via the switcher 56; this power is output to the outside as output power from the solid oxide fuel cell device 1. The output power is gradually increased from 0 W at time t10 to follow the required electrical generation amount. As described above, the rate of increase in output power is at this point limited to a maximum of 200 W/min.

After the transition to the generating mode, as well, supply of fuel and generating air to the fuel cell module 2 in the amounts used during the immediately prior startup mode operation is continued for a predetermined time. There is therefore a smooth transition from the startup mode operation to the generating mode operation. Next, after supply of the startup mode operation amount is maintained until time t11, the supply amounts of fuel and generating air are changed to be supply amounts responsive to actual output power (times t11-t12 in FIG. 7). Subsequent to time t12 in FIG. 7, fuel and generating air are supplied in amounts corresponding to the output power shown by the "Generating Mode" in FIG. 8. After transition to the generating mode operation, the fuel cell module 2 generating capacity is maintained at the power provided by startup generation, regardless of required power.

In the solid oxide fuel cell device 1 of this embodiment of present invention, a weak power is extracted from the fuel cell module 2 by executing startup electrical generation at the stage when the temperature of the solid oxide fuel cell units 16 has not yet sufficiently risen during the startup mode operation, so that heating of the solid oxide fuel cell units 16 can be promoted by this heat of electrical generation. In addition, heating of the fuel cell units 16 by combustion of fuel in the combustion section is performed from the top end portion of the cells so that temperature unevenness in the fuel cell units 16 can easily arise, whereas the heat of electrical generation created by startup generation is pronounced in the middle portion of the fuel cell units 16, so temperature unevenness is not prone to occur there. Therefore by the present embodiment, temperature unevenness in the fuel cell units 16 and the fuel cell stack 14 can be suppressed. If temperature unevenness does arise in the fuel cell units 16, electrical generation will take place in a state in which only a portion of the fuel cell units 16 have reached a temperature at which generation can occur, or in which a portion of the fuel cell units 16 have been overheated, thereby accelerating the degradation of the fuel cell units 16 and in some cases breaking the fuel cell units 16. Using the present embodiment, temperature unevenness in the fuel cell units 16 and the fuel cell stack 14 can be suppressed, thus enabling an extension of the number of years the fuel cell units 16 can last. Furthermore, electrical generation by startup generation produces a weak electrical power, so that the fuel cell units 16 are not damaged even if power is extracted from the fuel cell module 2 before the temperature of the fuel cell units 16 reaches the generation starting temperature.

In addition, according to the solid oxide fuel cell device 1 of the present embodiment, the weak power extracted during startup generation is an approximately fixed 50 W, therefore the fuel cell module 2 operation can, without varying the fuel supply amount or steam supply amount for executing startup generation, be prevented from becoming unstable even if power is extracted from the fuel cell module 2 prior to reaching the generation startup temperature. Damage to the solid oxide fuel cell units 16 can thus be reliably prevented and startup generation effected.

According to the solid oxide fuel cell device 1 of the present embodiment, startup generation is commenced in the higher steam-reforming ATR2 within the high reforming efficiency ATR, in which steam reforming capable of producing sufficient hydrogen is commenced, so there is no risk of hydrogen depletion even if the fuel cell units 16 generate electricity before reaching the generation start temperature, so damage to the fuel cell units 16 can be reliably prevented.

In general, electrical power output to outside the solid oxide fuel cell device fluctuates continually with fluctuations in power demand. According to the solid oxide fuel cell device 1 of the present embodiment, all of the weak power produced by startup generation in the startup mode operation is consumed by the auxiliary unit 4, with none being output to outside the solid oxide fuel cell device 1, thereby preventing unstable startup mode operation caused to fluctuations in current extracted from the fuel cell module 2 owing to the adverse effects of fluctuations in power demand. The weak power resulting from startup generation is consumed by the auxiliary unit 4 controlled by the control section 110, therefore the generated power at startup generation can be more stabilized.

Furthermore, according to the solid oxide fuel cell device 1 of the present embodiment, during the startup mode operation startup generation is started when the fuel cell units 16 temperatures reach 500° C., so the steam reforming reaction inside the reformer 20 can be stabilized, and startup generation prior to reaching the generation startup temperature can be reliably executed so as to raise the temperature by the heat of combustion.

Also, according to the solid oxide fuel cell device 1 of the present embodiment, the rate of increase in power from the startup generation is set to be far higher than the maximum rate of increase in output power during load following in the generating mode operation, making it possible to rapidly produce self-generated heat and reduce fuel cell startup time. Power from the startup generation is set to be sufficiently smaller than the generating capacity during generation startup, so damage to the fuel cell units 16 can be avoided even if the rate of increase is set to be high.

We have discussed a preferred embodiment of the present invention above, however various changes can be added to the above-described embodiment. In particular, in the above-described embodiments the solid oxide fuel cell device is constituted so that the solid oxide fuel cell device output power is variable in response to required power, but the present invention may also be applied to a fuel cell which outputs a fixed power at all times. Also, in the embodiments described above, the power from startup generation is supplied to an auxiliary unit, but the present invention could also be constituted so that this power is consumed outside the solid oxide fuel cell device.

In the above-described embodiments, startup generation is commenced at the point when the temperature of the fuel cell units 16 reaches 500° C. during ATR2, but as a variation, startup generation could also be commenced at the time when SR1 is started, or after a predetermined time elapses following the start of SR1. When transitioning from ATR to SR, the partial oxidation reforming reaction inside the reformer 20 ends and the endothermic steam reforming reaction increases, so the solid oxide fuel cell units can also drop in temperature along with the reformer. In the variation above, startup generation commences when reforming by SR begins, at which time the temperature can easily drop, or after a predetermined time following the commencement of reforming by SR. Startup generation thus commences together with the startup of the SR, when the temperature can easily drop, or after a predetermined time has elapsed following the commencement of SR reforming such that the reforming reaction inside the reformer 20 has stabilized, therefore the drop in temperature in the fuel cell module 2 can be suppressed and startup generation can be implemented prior to reaching the generation startup temperature.

What is claimed is:

1. A solid oxide fuel cell system for generating electricity by reacting fuel and oxidation gas, comprising:
   a fuel cell module comprising multiple solid oxide fuel cell units;
   a reformer configured to produce hydrogen through a series of startup operations including a steam reforming reaction (SR) operation, in which fuel is steam reformed by chemically reacting fuel and steam, and an auto thermal reforming reaction (ATR) operation, in which fuel is auto-thermally reformed by simultaneously inducing partial oxidation reforming and steam reforming;
   a fuel supply device configured to feed the fuel to the reformer and the reformed fuel to the solid oxide fuel cell units;
   a reforming oxidation gas supply device configured to supply the oxidation gas to the reformer;
   a steam supply device configured to supply steam to the reformer;
   an electricity generation oxidation gas supply device configured to supply oxidation gas to the solid oxide fuel cell units to generate electricity;
   a combustion section placed at one end portion of the solid oxide fuel cell units to combust fuel left unused in electricity generation; and
   a controller programmed to control the fuel supply device, the reforming oxidation gas supply device, the steam supply device, and the electricity generation oxidation gas supply device, wherein
   the controller is programmed to effect the startup operations including the ATR and SR operations inside the reformer to heat the solid oxide fuel cell units to an electricity generating startup temperature at which electrical power can be extracted from the fuel cell module, and after the solid oxide fuel cell units are heated above the electricity generating startup temperature and the startup operations end, the controller is further programmed to effect executes an electricity generating operation in which electrical power is extracted from the fuel cell module, and
   the controller is further programmed to effect a startup electricity generation operation in which a weak electricity is extracted from the fuel cell module to thereby generate heat and raise the temperature of the solid oxide fuel cell units during the startup operations, the weak electricity extracted during the startup electricity generation operation being smaller than the electric power extracted from the fuel cell module during the electricity generating operation.

2. The solid oxide fuel cell system according to claim 1, wherein the weak electricity is extracted at a substantially constant rate from the fuel cell module during the startup electrical generation.

3. The solid oxide fuel cell system according to claim 2, wherein the controller is programmed to commence the startup electrical generation after reforming by the ATR operation begins in the reformer during the startup operations.

4. The solid oxide fuel cell system according to claim 3, wherein the ATR operation comprises an ATR1 operation, in which an amount of steam supplied to the reformer is small, and an ATR2 operation performed after the ATR1 operation, in which an amount of steam supplied is greater than that supplied in the ATR1 operation, and the controller is programmed to commence the startup electrical generation after the ATR2 operation begins.

5. The solid oxide fuel cell system according to claim 3, wherein the controller is programmed to commence the startup electrical generation after reforming by the SR operation begins in the reformer.

6. The solid oxide fuel cell system according to claim 3, wherein the controller is programmed to deliver at least some of the electrical power extracted from the fuel cell module during the electricity generating operation to outside the solid oxide fuel cell system, while being programmed to deliver, solely for internal use in the solid oxide fuel cell system, the weak electrical power extracted from the fuel cell module during the startup electricity generation operation.

7. The solid oxide fuel cell system according to claim 6, further comprising an auxiliary device for operating the fuel cell module, wherein all of the weak electrical power extracted from the fuel cell module during the startup electricity generating operation is consumed by the auxiliary device.

8. The solid oxide fuel cell system according to claim 1, wherein the electricity generating startup temperature is set to 600° C. or above, and during the startup operations, the control is programmed to commence the startup electricity generation operation when a temperature of the solid oxide fuel cell units has reached a temperature greater than 500° C. and less than 600° C.

* * * * *